United States Patent
Schmitt

[15] 3,679,239
[45] July 25, 1972

[54] COMPRESSION COUPLING FOR PLASTIC PIPE

[72] Inventor: Joseph R. Schmitt, Dubuque, Iowa
[73] Assignee: A. Y. McDonald Mfg. Co.
[22] Filed: June 25, 1971
[21] Appl. No.: 156,734

[52] U.S. Cl. ..............................285/176, 285/249, 285/331, 285/341, 285/348
[51] Int. Cl. .......................................................F16l 55/00
[58] Field of Search...............285/249, 341, 348, 331, 334.4, 285/248, 176

[56] References Cited

UNITED STATES PATENTS 3,030,130 4/1962 Appleton................................285/248

FOREIGN PATENTS OR APPLICATIONS 844,778 5/1939 France....................................285/249
1,185,621 2/1959 France....................................285/249
1,201,120 6/1959 France....................................285/249

*Primary Examiner*—Dave W. Arola
*Attorney*—Axel A. Hofgren et al.

[57] ABSTRACT

A compression coupling for connecting plastic pipe to an externally threaded hollow connector which has an end surface. Any pipe of a controlled outer diameter or made to standard outer dimensions can be used in the coupling. The coupling is a pre-assembled unit with a chamber in which slidable compressor means abuts the end surface of the connector as the coupling is screwed onto it, and the compressor means slides forwardly to compress a rubber compression ring between two wedging surfaces in the chamber and thereby squeeze the ring to clamp the end portion of a plastic pipe firmly onto a rigid sleeve which is part of the compressor means.

10 Claims, 3 Drawing Figures

PATENTED JUL 25 1972 3,679,239
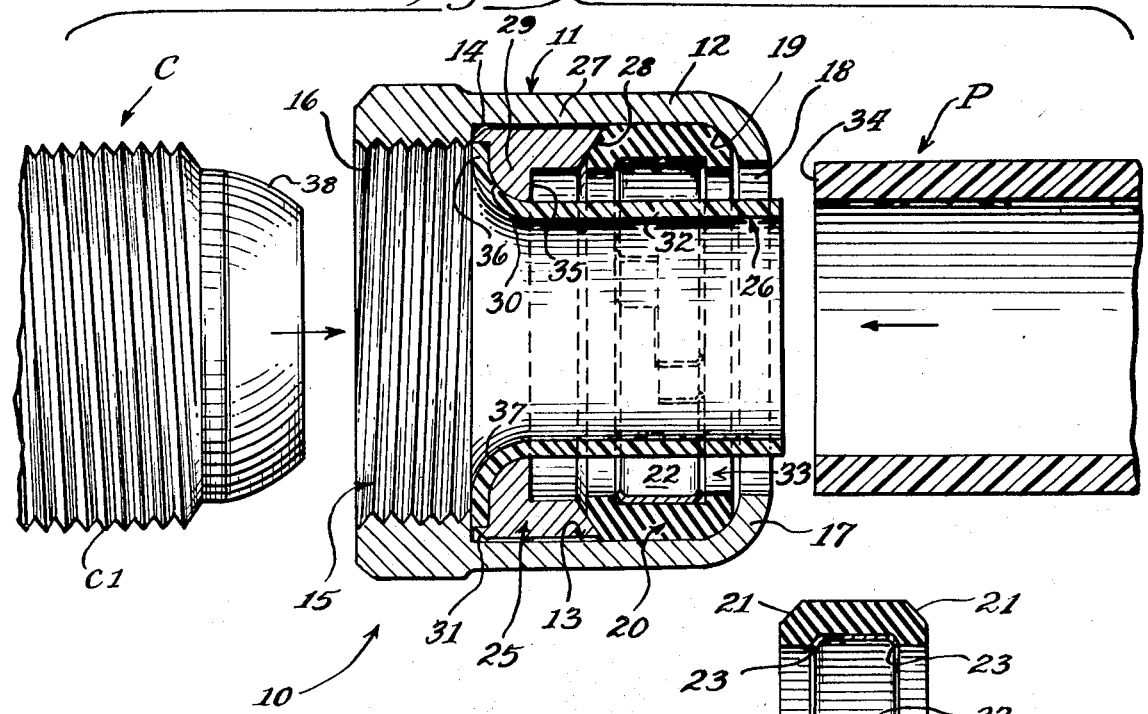
Fig. 1.
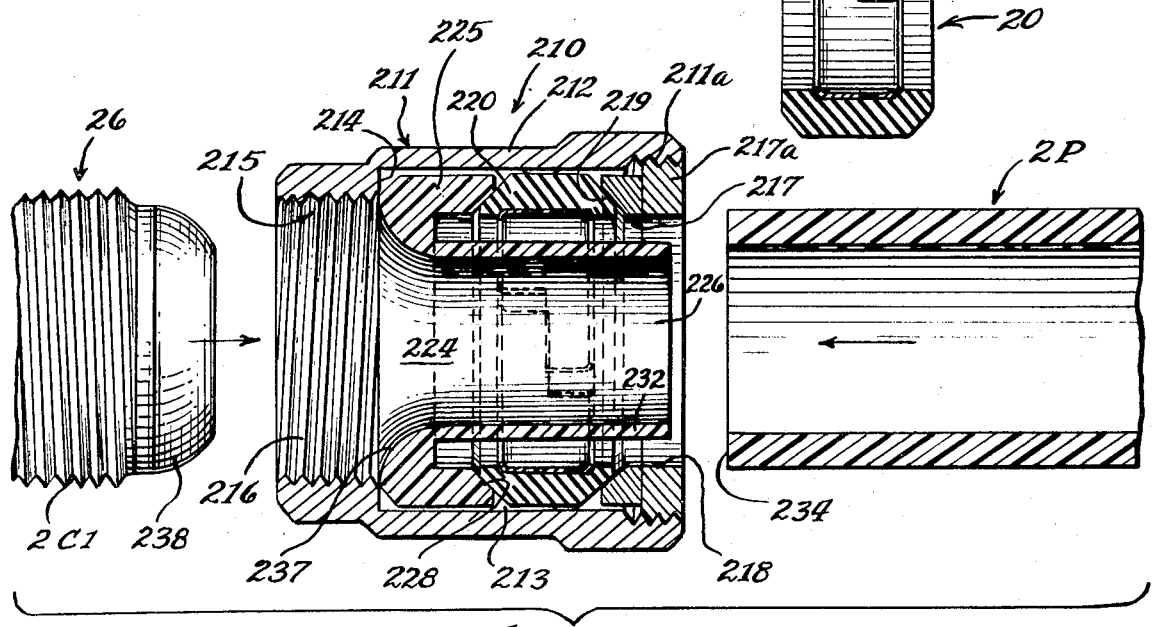
Fig. 3.
Fig. 2.
Inventor
Joseph R. Schmitt
By Hofgren, Wegner, Allen,
Stellman and McCord Attys.

3,679,239

COMPRESSION COUPLING FOR PLASTIC PIPE

BACKGROUND OF THE INVENTION

Plastic pipe is being used in large quantities to make the connections between municipal water mains and the branch lines to commercial, residential and industrial buildings. Water mains are usually laid several feet under ground below the frost line, so that connecting a branch line to the main or replacing a broken branch line requires that it be dug out and any connectors applied under conditions in which it is difficult to avoid getting dirt into them.

Conventional water main installations require four couplings between the main and the building to which the water is piped. Tapped into the wall of the water main is a corporation stop which includes a cutoff valve, and the corporation stop has a connector to which a branch line must be coupled. Between the corporation stop and the building is a curb stop which contains the manually operable valve ordinarily used to disconnect the building supply line from the water main. The line from the corporation stop must be coupled to the curb stop, and a second line coupled to the curb stop extends to the building where it is ordinarily coupled to the water meter.

The means for coupling plastic pipe to the corporation stop and to the curb stop must make a seal against leakage of water at the coupling, and must also grip the end portion of the pipe in such a way that the water pressure normally encountered in the pipe will not blow it loose from the coupling. This, of course, requires very firm clamping because the pipe is not screwed into the coupling.

Prior art pipe couplings have always had to be assembled on the job, with the attendant risk of dropping internal components in the dirt. Furthermore, the municipal water departments and their suppliers have had to keep supplies of matching parts for couplings of different sizes. Each type of coupling and each manufacturer of a coupling required specials in order to fasten pipe to the curb stop. Inspection was also difficult due to inability to make sure all parts of a given assembly were actually present. Whether a part was missing from an assembled coupling could not be observed after assembly was complete.

Further, couplings heretofore available have not been capable of withstanding any substantial pressure surges in the line without the risk of blowing out.

SUMMARY OF THE INVENTION

The present invention provides a compression coupling for plastic pipe which is a pre-assembled unit that can be screwed directly onto the projecting threaded connector on a corporation stop or a curb stop and then have the end portion of a plastic pipe inserted into its outer end. As the coupling is screwed further onto the connector, a nose surface on the connector engages a cooperating annular surface of a compressor means in the coupling so as to slide the compressor means forwardly and squeeze a rubber compression ring radially inwardly so that a split steel ring in the compression ring bites into the wall of the plastic pipe. The result is a watertight seal and a connection between the coupling and the plastic pipe which can withstand pressure substantially in excess of 500 pounds per square inch.

The hollow connector onto which the coupling of the present invention is screwed is a standard commercially available unit that is commonly used for this purpose; and the rubber compression ring in the coupling with its internal split metal ring is also a standard commercially available compression ring previously used in prior art couplings.

Accordingly, the principal object of the present invention is to provide an improved coupling for plastic water pipe or any pipe having standardized outer diameter dimensions.

A further object of the invention is to provide a coupling for plastic water pipe which is a pre-assembled unit which simplifies the coupling of plastic water pip to other water distribution system components in the field; and which also reduces the number of parts that must be stocked by service personnel and suppliers.

Another object is to provide a coupling connectable to standard ball joint end connections conforming to AWWA standards, regardless of manufacturer.

Another object is to provide a coupling completely self contained, requiring only insertion of pipe and turning onto standard threads.

Still another object of the invention is to provide a coupling for pipe which makes a positive, water-tight and blowout proof connection between a pipe and a pipe connector of a water system corporation stop or curb stop.

BRIEF DESCRIPTION OF THE DRAWINGS

FIG. 1 is a longitudinal central sectional view of a preferred embodiment of the invention in position to be screwed onto a hollow connector and to receive the end portion of a piece of plastic pipe;

FIG. 2 is a view like FIG. 1 illustrating a second embodiment of the invention; and FIG. 3 is a longitudinal central sectional view of the rubber compression ring and its internal split ring.

DETAILED DESCRIPTION OF THE INVENTION

Referring to the drawings in greater detail, and referring first to FIG. 1, a compression coupling, indicated generally at 10, is adapted to be mounted upon a hollow connector C and to receive the end portion P of a plastic pipe. The coupling consists of a housing 11 having a cylindrical wall 12 which defines a chamber 13, and at the rear of the chamber is an internal annular shoulder 14 which defines the front margin of a bore 15 that is internally threaded at 16 so that it may be screwed onto an external thread C1 of the hollow connector C. At the front of the housing 11 is an internal annular front shoulder means 17 which defines the rear margin of a pipe receiving opening 18, and the front shoulder means 17 is provided with a rearwardly facing wedging surface 19. In the embodiment of the invention illustrated in FIG. 1, the front shoulder means 17 is formed by bending in the front of the housing wall 12 after the internal components of the coupling are in place; however, any other convenient manner of providing a surface 19 would be satisfactory.

In the chamber abutting the rearwardly facing wedging surface 19 is a rubber compression ring 20 which is best seen in FIG. 3 to have circumferential clamping faces 21 and to have an internal steel split ring 22 provided with inturned edges 23 that bite into the wall of the end portion P of a plastic pipe when the compression ring is squeezed.

Also in the chamber 13 is compressor means, which includes an annular spacer collar 25 and a rigid sleeve 26.

The spacer collar 25 includes a longitudinal extending annular body 27 having a forwardly facing wedging surface 28 that abuts the rubber compression ring 20, and a radially inwardly extending rear portion 29 having an arcuate face 30. At the extreme rear of the spacer collar 25 is a peripheral rear wall 31 which abuts the rear shoulder 14.

The sleeve 26 has a longitudinally extending body 32 which is positioned concentrically within the compression ring 20 and the spacer collar 25 and defines therewith an annular cavity 33 that snugly receives the end portion P of a plastic pipe which may be inserted into the cavity until its end 34 abuts a radial surface 35 of the spacer collar which acts as a pipe stop.

The sleeve 26 is of uniform thickness throughout, and at its rearward end is an external flange 36 which is curved to fit the surface 30 of the spacer collar and seats within the peripheral rear wall 31 of the spacer collar abutting the rear shoulder 14.

The sleeve flange 36 has a rear surface 37 which is seen to be bell-shaped to cooperate with a convexly curved nose surface 38 of the connector C, a standard AWWA ball joint end connection. The curved surface 37 provides all the transition that is needed between the nose of a standard AWWA coupler C and a pipe held in the compression coupling of this invention. Every piece needed to connect to the pipe is in the coupling. The nose of the standard ball joint end connector is just pressed against surface 37 to provide the necessary squeeze, effecting a tight coupling.

In use, the coupling 10 is screwed onto the thread C1 of the connector C until a slight resistance indicates that the bell-shaped surface 37 of the sleeve flange has contacted the nose surface 38 of the connector. Thereupon the end portion P of the plastic pipe is thrust into the cavity 33 until the resistance to further movement indicates that the end 34 of the pipe has abutted the stop surface 35 of the spacer collar. The pipe makes a snug sliding fit in the cavity 33 and is firmly backed up by the rigid body 32 of the sleeve.

The coupling is then screwed further onto the connector C so that the nose surface 38, acting against the bell-shaped rear surface 37 of the sleeve flange, pushes the compressor means 24, consisting of the sleeve 26 and the spacer collar 25, forwardly in the chamber to compress the rubber ring between the wedging surfaces 19 and 28 and squeeze it radially onto the pipe with the inturned edges 23 of the split ring biting into the pipe wall.

Preferably the spacer collar 25 and the sleeve 26 are molded from a very rigid, high tensile plastic material which, in a sleeve having a wall thickness of only 0.0625 inch, can adequately sustain the crushing force imparted to it by the squeezing of the rubber compression ring into the plastic pipe. A preferred material is glass filled NORYL, a modified polyphenylene oxide obtainable from the Plastics Department of General Electric Corporation. In the form illustrated in FIG. 1, the brass of the housing may turn while being screwed onto the end connection C relative to the rubber sleeve which becomes stationary when gripping the pipe. An intermediate ring between rubber and brass abutting parts may decrease wear should the coupling be subjected to repeated attachments and removals.

The second embodiment of the invention, illustrated in FIG. 2, is basically like the first embodiment, and corresponding parts are given the same reference numerals but 200 numbers higher.

In the second embodiment a compression coupling, indicated generally at 210, consists of a housing 211 having a cylindrical wall 212 which defines a chamber 213, and at the rear of the chamber is an internal annular shoulder 214 which defines the front margin of a bore 215 that is internally threaded at 216 so that it may be screwed onto an external thread 2C1 of a hollow connector 2C. At the front of the housing 211 is an internal annular front shoulder means 217 which, in the second embodiment, is a separate ring held in the coupling by a threaded insert ring 217a which screws onto a thread 211a cut in the rear of the cylindrical housing wall 211. The threaded ring 217a provides a pipe receiving opening 218, and the front shoulder means 217 is provided with a rearwardly facing wedging surface 219. The shoulder 217 may frictionally stop with a rubber ring 220 when it stops rotating as the coupling housing is attached to a connector.

In the chamber 213 abutting the rearwardly facing wedging surface 219 is the rubber compression ring 220 which is identical with the compression ring 20.

In the second form of the invention the compressor means 224 is formed with a spacer collar 225 and a sleeve 226 which are unitary, but which nevertheless have a forwardly facing wedging surface 228, a sleeve body 232, and a bell-shaped rear surface 237 so that the compressor means 224 cooperates with a connector nose 238 and with the rubber compression ring 220 in precisely the same way as does the two-part compressor means of the first embodiment of the invention.

Either form of the coupling provides a chamber for the pipe and the sleeves 26, 226, thus providing adequate back up for plastic pipe; however, metal pipe of proper outer diameter size may also be accommodated. In the use of the coupling with thin-walled metal pipe of pipe-sized outer diameter, the pipe may not bear internally on the sleeve, yet a proper seal will be made on the outer surface. The use of pipe-sized plastic pipe makes the couplings immediately useful with similarly sized copper, aluminum, stainless steel and other metal pipe.

The foregoing detailed description is given for clearness of understanding only and no unnecessary limitations should be understood therefrom, as modifications will be obvious to those skilled in the art.

I claim:

1. A self-contained compression coupling for connecting standardized outer diameter sized pipe to standardized flare ball joint end connectors comprising:

a housing having a cylindrical wall which defines a chamber and at the rear of said chamber an internal annular rear shoulder means defining the front margin of a bore which is adapted to receive a hollow connector having a nose surface, and internal annular front shoulder means at the forward end of said housing defining the rear margin of a pipe receiving opening;

a rubber compression ring in the housing intermediate said rear and front shoulder means;

means forming a wedging surface at the forward end of said housing facing said compression ring; and compressor means slidable forwardly in the housing to force the compression ring against said wedging surface, said compressor means including an annular spacer collar which has a forwardly facing wedging surface abutting the ring, and a rigid sleeve concentrically within the ring and the collar and defining therewith an annular cavity that receives the end portion of a pipe inserted through said opening, said sleeve having an external end flange which normally bears against the rear shoulder and is operatively associated with the spacer collar, said sleeve flange having a rear surface which is engaged by the connector nose surface as the housing moves endwise onto the connector to move the sleeve and collar forwardly and thereby compress the rubber ring between the wedging surfaces to squeeze it radially inwardly to clamp such ring against the pipe in a sealed relationship, coupling to the outer surface of the pipe.

2. The combination of claim 1 in which the bore is internally threaded to screw onto an externally threaded connector.

3. The combination of claim 1 in which the rear surface of the sleeve is bell-shaped to cooperate with a connector having a convexly curved nose surface.

4. The combination of claim 1 in which the compression ring has an internal split metal ring with radially extending portions which bite into the pipe as the ring is squeezed.

5. The combination of claim 1 in which the periphery of the rear end portion of the sleeve is integral with the spacer collar.

6. The combination of claim 1 in which the spacer collar has a peripheral rear wall which abuts the rear shoulder, and the periphery of the sleeve flange seats within said wall and also abuts the rear shoulder.

7. The combination of claim 1 in which the sleeve and spacer collar are integral.

8. The combination of claim 1 in which the front shoulder means retains the compression ring and compressor means within the chamber captured between such front and rear shoulder means.

9. The combination of claim 1 in which the front end portion of the housing wall is threaded, and the front shoulder means is provided by a threaded ring screwed therein.

10. A self-contained compression coupling for connecting pipe sized plastic pipe to standardized American Water Works Association flare ball joint end connections comprising:

a housing having a generally cylindrical wall with internal threads at one end for threaded connection to an externally threaded end connection;

shoulder means adjacent such internal threads facing away from the threads and an opposed shoulder means carried by the housing at the other end so that said shoulder means together form a chamber therebetween within the coupling;

a rubber compression ring in the chamber;

annular compressor means in the chamber having a first wedge surface against the compression ring on the internally threaded side of the latter and a second wedge surface on the other side of the compression ring; and said compressor means including a transition piece to engage the nose of a ball joint end connection and a rigid sleeve to snugly fit the inside of a plastic pipe inserted into the coupling between said rubber ring and sleeve, tightening of said coupler upon an end connection moving said compressor means lengthwise to squeeze said ring radially inwardly against said plastic pipe and said pipe against the plastic sleeve as a back up against the squeezing forces.

* * * * *